(12) United States Patent
Zhao et al.

(10) Patent No.: US 10,591,758 B2
(45) Date of Patent: Mar. 17, 2020

(54) CURVED LIQUID CRYSTAL DISPLAY PANEL AND CURVED LIQUID CRYSTAL DISPLAY DEVICE

(71) Applicant: BOE Technology Group Co., Ltd., Beijing (CN)

(72) Inventors: Weili Zhao, Beijing (CN); Jae-Geon You, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 883 days.

(21) Appl. No.: 14/892,671

(22) PCT Filed: May 8, 2015

(86) PCT No.: PCT/CN2015/078543
§ 371 (c)(1),
(2) Date: Nov. 20, 2015

(87) PCT Pub. No.: WO2016/086599
PCT Pub. Date: Jun. 9, 2016

(65) Prior Publication Data
US 2016/0357038 A1 Dec. 8, 2016

(30) Foreign Application Priority Data

Dec. 5, 2014 (CN) .......................... 2014 1 0738578

(51) Int. Cl.
*G02F 1/1333* (2006.01)
*G02F 1/13363* (2006.01)
(Continued)

(52) U.S. Cl.
CPC ........ *G02F 1/1333* (2013.01); *G02F 1/13363* (2013.01); *G02F 1/133528* (2013.01);
(Continued)

(58) Field of Classification Search
CPC ........ G02F 2001/133302; G02F 2001/133331; G02F 1/13363; G02F 2001/133635; G02F 2202/09; G02F 2202/40
See application file for complete search history.

(56) References Cited

U.S. PATENT DOCUMENTS 6,011,646 A * 1/2000 Mirkarimi .............. G02B 1/105
359/359
7,310,127 B2 * 12/2007 Sato .................... G02F 1/13363
349/117
(Continued)

FOREIGN PATENT DOCUMENTS

| CN | 1612185 A | 5/2005 |
|---|---|---|
| CN | 101000388 A | 7/2007 |

(Continued)

OTHER PUBLICATIONS

First Office Action, including Search Report, for Chinese Patent Application No. 201410738578.7, dated Sep. 2, 2016, 6 pages.
(Continued)

*Primary Examiner* — Paisley L Wilson
(74) *Attorney, Agent, or Firm* — Westman, Champlin & Koehler, P.A.

(57) ABSTRACT

A curved liquid crystal display panel and a curved liquid crystal display device are disclosed. The curved liquid crystal display panel comprises: two substrates curved towards a same direction with liquid crystals filled therebetween to form a curved liquid crystal layer; and a transparent layer covering an outer surface of a glass of at least one of the substrates, a stress-optical coefficient of the glass of the substrate and a stress-optical coefficient of the transparent layer at a same side of the liquid crystal layer have opposite signs, wherein the outer surface of the glass of the substrate is a surface of the glass of the substrate away from the liquid crystals. The curved liquid crystal display device comprises
(Continued)

the curved liquid crystal display panel. The optical rotation effects of the glass of the substrate and the transparent layer located at the same side of the liquid crystal layer are opposite from each other, optical delay thereof are counteracted by each other. Display effect of the curved liquid crystal display panel and the curved liquid crystal display device according to embodiments of the invention is improved largely.

14 Claims, 2 Drawing Sheets

(51) Int. Cl.
  *G02F 1/1335*   (2006.01)
  *G02F 1/1343*   (2006.01)

(52) U.S. Cl.
  CPC ............. *G02F 1/134363* (2013.01); *G02F 2001/133302* (2013.01); *G02F 2001/133331* (2013.01); *G02F 2001/133531* (2013.01); *G02F 2201/56* (2013.01); *G02F 2202/09* (2013.01); *G02F 2202/40* (2013.01)

(56) References Cited

U.S. PATENT DOCUMENTS

| | | | |
|---|---|---|---|
| 7,943,932 B2 | 5/2011 | Park et al. | |
| 2007/0229738 A1 | 10/2007 | Nakao et al. | |
| 2010/0029459 A1* | 2/2010 | Zwanziger | ............ C03C 3/062 501/42 |
| 2014/0327861 A1* | 11/2014 | Huang | ............... G02F 1/13363 349/96 |

FOREIGN PATENT DOCUMENTS

| | | |
|---|---|---|
| CN | 101046572 A | 10/2007 |
| CN | 101241915 A | 8/2008 |
| CN | 104360535 A | 2/2015 |
| CN | 204203587 U | 3/2015 |
| JP | 2005-134460 A | 5/2005 |
| WO | 2013/085084 A1 | 6/2013 |

OTHER PUBLICATIONS

International Search Report and Written Opinion for International Application No. PCT/CN2015/078543, dated Aug. 28, 2015, 9 pages.

English translation of Box No. V of the Written Opinion of the International Searching Authority for International Application No. PCT/CN2015/078543, 1 page.

* cited by examiner

CURVED LIQUID CRYSTAL DISPLAY PANEL AND CURVED LIQUID CRYSTAL DISPLAY DEVICE

CROSS-REFERENCE TO RELATED APPLICATION

This application is a Section 371 National Stage Application of International Application No. PCT/CN2015/078543, filed on 8 May 2015, entitled "CURVED LIQUID CRYSTAL DISPLAY PANEL AND CURVED LIQUID CRYSTAL DISPLAY DEVICE", which has not yet published, which claims priority to Chinese Application No. 201410738578.7, filed on 5 Dec. 2014, incorporated herein by reference in their entirety.

BACKGROUND OF THE INVENTION

Field of the Invention

Embodiments of the invention relate to the field of liquid crystal display technology, and specifically, to a curved liquid crystal display panel and a curved liquid crystal display device.

Description of the Related Art

In the In Plane Switching (IPS) mode of a flat liquid crystal display panel, liquid crystal molecules of the penal have an approximate parallel and uniform orientation relative to a surface of a substrate in a non-driven state, so that the oscillation direction of light almost does not change as it passes through the liquid crystal layer. If the polarization directions of two polarizing plates disposed on outer surfaces of two substrates are perpendicular with each other, the liquid crystal display panel will perform a display that is almost entirely black.

In liquid crystal display panel, conventionally, the glasses of the color filter substrate and the array substrate are glasses having positive stress-optical coefficients. For a curved liquid crystal display panel of the In Plane Switching (IPS) mode, surface of the curved liquid crystal display panel for display is usually concave. Thus, a surface of the color filter substrate of the flat liquid crystal display panel of the IPS mode facing the users should be curved inward, such that the glass of the color filter substrate is subject to compression, and the glass of the array substrate is subjected to stretching. Through testing, it is found that the main optical axis of the curved glass of the color filter substrate and the main optical axis of the curved glass of the array substrate are perpendicular with each other, the angle between the main optical axis of the curved glass of the color filter substrate and the initial orientation of the curved liquid crystal layer is variable and a maximum value of the variable angle is 45 degree, wherein the initial orientation of the curved liquid crystal layer is an orientation of the liquid crystal layer in a non-driven state before the liquid crystal layer is curved. The following description is based on the following situation, in which the angle between the main optical axis of the curved glass of the color filter substrate and the initial orientation of the curved liquid crystal layer is the maximum angle of 45 degree. As shown in FIG. 1, the arrows in the upper polarizing plate 31 and the lower polarizing plate 32 indicate respective polarization direction of the plates, the arrows in the glass 11 of the color filter substrate and the glass 12 of the array substrate indicate respective main optical axis direction of the glasses, and the arrow in the liquid crystal layer 20 indicates an initial orientation of the curved liquid crystal layer. An angle between the polarization direction of the lower polarizing plate 32 and the initial orientation of the curved liquid crystal layer 20 is 0 degree, an angle between the main optical axis direction of the glass 12 of array substrate and the initial orientation of the curved liquid crystal layer 20 is 135 degrees, an angle between the main optical axis direction of the glass 11 of color filter substrate and the initial orientation of the curved liquid crystal layer 20 is 45 degrees, an angle between the polarization direction of the upper polarizing plate 31 and the initial orientation of the curved liquid crystal layer 20 is 90 degrees. Natural light emitted by a backlight source firstly passes through the lower polarizing plate 32 and becomes linearly polarized light; the linearly polarized light passes through the glass 12 of the array substrate subjected to stretching and having a positive stress-optical coefficient and becomes elliptically polarized light due to the optical rotation effect of the glass 12 of the array substrate; at this time, the liquid crystal layer may also rotate light because the light enters the liquid crystal layer is no longer the linearly polarized light in parallel or perpendicular with the orientation of the liquid crystals; after being rotated by the curved liquid crystal layer, light enters the glass 11 of the color filter substrate being subjected to compression and is affected by the optical rotation effect of the glass of the color filter substrate 11. As shown in FIG. 2, the arrow pointing upwards indicates the optical rotation effect of the glass of the array substrate, the circular arc having an arrow indicates the optical rotation effect of the curved liquid crystal layer, and the arrow pointing downwards indicates the optical rotation effect of the glass of the color filter substrate. It can be seen that, the light having been rotated for three times is diverged far from the original light. The same principle applies when the angel between the main optical axis of the curved glass of the color filter substrate and the initial orientation of the liquid crystal layer is an angle having a different degree. In such a way, before light enters the upper polarizing plates, there may be various oscillation directions of light, such that a certain part of light may pass through the upper polarizing plate, causing a significant light leak of the curved liquid crystal display panel of the IPS mode.

SUMMARY OF THE INVENTION

Embodiments of the invention provides a curved liquid crystal display panel and a curved liquid crystal display device, thereby solving the technical problem of significant light leak in existing curved liquid crystal display panels and curved liquid crystal display devices.

Embodiments of the invention disclose the following technical solution:

A curved liquid crystal display panel, comprising:

two substrates curved towards a same direction with liquid crystals filled therebetween to form a curved liquid crystal layer;

a transparent layer covering an outer surface of a glass of at least one of the substrates, a stress-optical coefficient of the glass of the substrate and a stress-optical coefficient of the transparent layer at the same side of the liquid crystal layer have opposite signs, wherein the outer surface of the glass of the substrate is a surface of the glass of the substrate away from the liquid crystals.

In an embodiment of the invention, at a same side of the liquid crystal layer, a product of the stress-optical coefficient of the glass of the substrate and a thickness of the glass of the substrate has an opposite sign to a product of the stress-optical coefficient of the transparent layer and a thickness of the transparent layer, and a percentage of a difference between absolute values of the products is no more than 20%.

In an embodiment of the invention, two transparent layers are covered on the outer surfaces of the glasses of the two substrates;

the curved liquid crystal display panel further comprises two polarizing plates covering outer surfaces of the two transparent layers respectively; and the outer surfaces of the two transparent layers are surfaces of the two transparent layers away from the liquid crystals.

In an embodiment of the invention, a display mode of the curved liquid crystal display panel is In-Plane-Switching (IPS) mode.

In an embodiment of the invention, both of the stress-optical coefficients of the glasses of the two substrates are positive, and both of the stress-optical coefficients of the two transparent layers are negative; or both of the stress-optical coefficients of the glasses of the two substrates are negative, and both of the stress-optical coefficients of the two transparent layers are positive; or the stress-optical coefficient of the glass of one of the substrates is positive and the stress-optical coefficient of the transparent layer covering the outer surface of the one of the substrates is negative, while the stress-optical coefficient of the glass of the other one of the substrates is negative and the stress-optical coefficient of the transparent layer covering the outer surface of the other one of the substrates is positive.

In an embodiment of the invention, the transparent layer is glass and the stress-optical coefficient of the transparent layer is a value in a range of −0.5 to −1.5 Brewster.

In an embodiment of the invention, a polarization direction of one of the polarizing plates is perpendicular or parallel with an initial orientation of the curved liquid crystal layer; and the initial orientation of the curved liquid crystal layer is an orientation of the curved liquid crystal layer in a non-driven state before the liquid crystal layer is curved.

In an embodiment of the invention, the polarization directions of the two polarizing plates are perpendicular or parallel with each other.

In an embodiment of the invention, the two substrates comprise an array substrate and a color filter substrate.

The embodiments of the invention further provide the following technical solution:

A curved liquid crystal display device comprises the curved liquid crystal display panel according to any one of the above embodiments.

In the curved liquid crystal display panel and the curved liquid crystal display device according to the embodiments of the invention, the stress-optical coefficients of the glasses of the substrates and the transparent layer disposed at the same side of the liquid crystal layer have opposite signs, such that the optical rotation effects of the substrates and the transparent layer disposed at the same side of the liquid crystal layer are opposite from each other, thereby reducing the optical delay of light passing through them. Display effect of the curved liquid crystal display panel and the curved liquid crystal display device according to the embodiments of the invention is significantly improved.

In another embodiment of the invention, there is provided a curved liquid crystal display panel, which comprises: two substrates curved towards a same direction; liquid crystals filled between the two substrates to form a curved liquid crystal layer; and a transparent layer covering an outer surface of a glass of at least one of the substrates, wherein the outer surface of a glass of the substrate being the surface away from the liquid crystals, and at a same side of the liquid crystal layer, a product of the stress-optical coefficient of the glass of the substrate and a thickness of the glass of the substrate has an opposite sign to a product of the stress-optical coefficient of the transparent layer and a thickness of the transparent layer, and a percentage of a difference between absolute values of the products is no more than 20%.

LIST OF REFERENCE NUMBERS

In prior arts:
11—glass of the color filter substrate;
12—glass of the array substrate;
20—liquid crystal layer;
31—upper polarizing plate;
32—lower polarizing plate;
In embodiments of the invention:
110—glass of the color filter substrate;
120—glass of the array substrate;
200—liquid crystal layer;
310—first glass
320—second glass
410—first polarizing plate;
420—second polarizing plate;

DETAILED DESCRIPTION OF PREFERRED EMBODIMENTS OF THE INVENTION

Technique solutions according to embodiments of the present invention will be described clearly and completely hereinafter in detail with reference to the attached drawings. It would be apparent that the described embodiments are only parts, rather than all, of the embodiments of the present invention. Other implementations made, based on the embodiments in the present invention, by those skilled in the art without any inventive work, fall within scopes of the present invention.

Figure 1:
FIG. 1 is an illustrative drawing showing an existing curved liquid crystal display panel.
Figure 2:
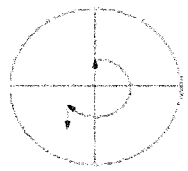
FIG. 2 is an illustrative drawing showing the optical rotation effect of the curved liquid crystal display panel shown in FIG. 1.
Figure 3:
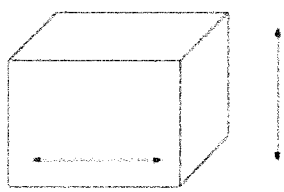
FIG. 3 is an illustrative drawing showing that the fast axis is perpendicular to the main optical axis when a crystal having a positive stress-optical coefficient is subjected to stretching.
Figure 4:
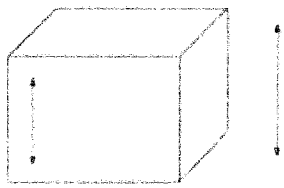
FIG. 4 is an illustrative drawing showing that the fast axis is in parallel with the main optical axis when a crystal having a positive stress-optical coefficient is subjected to compression.
Figure 5:
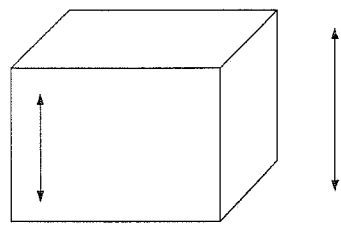
FIG. 5 is an illustrative drawing showing that the fast axis is in parallel with the main optical axis when a crystal having a negative stress-optical coefficient is subjected to stretching.
Figure 6:
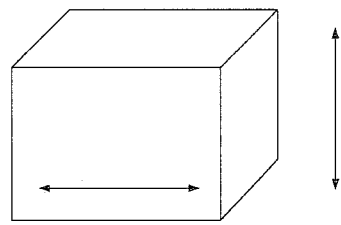
FIG. 6 is an illustrative drawing showing that the fast axis is perpendicular to the main optical axis when a crystal having a negative stress-optical coefficient is subjected to compression.

A crystal having a positive stress-optical coefficient has different behaviors as compared with a crystal having a negative stress-optical coefficient when they are subjected to stretching and compression. As shown in FIG. 3, when a crystal having a positive stress-optical coefficient is subjected to stretching, the fast axis is perpendicular to the main optical axis; as shown in FIG. 4, when a crystal having a positive stress-optical coefficient is subjected to compression, the fast axis is parallel to the main optical axis; As shown in FIG. 5, when a crystal having a negative stress-optical coefficient is subjected to stretching, the fast axis is parallel to the main optical axis; as shown in FIG. 6, when a crystal having a negative stress-optical coefficient is subjected to compression, the fast axis is perpendicular to the main optical axis; wherein the arrows outside the crystal are main optical axis, and the arrows inside the crystal are fast optical axis. That is, when the crystal having a positive stress-optical coefficient and the crystal having a negative stress-optical coefficient are subjected to stretching, the optical rotation effects of the two crystals are opposite from each other; and when the crystal having a positive stress-optical coefficient and the crystal having a negative stress-optical coefficient are subjected to compression, the optical rotation effects of the two crystals are opposite from each other. That is to say, if two crystals have stress-optical coefficients of opposite signs, the optical rotation effects thereof are opposite when they are subjected to stretching or compression.

Figure 7:
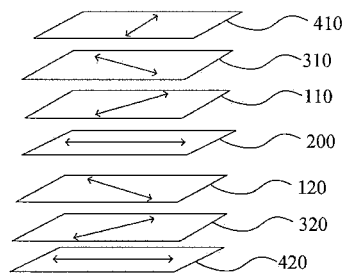
FIG. 7 is an illustrative drawing showing the curved liquid crystal display panel according to embodiments of the invention.

A curved liquid crystal display device according to a first embodiment of the invention comprises a curved liquid crystal display panel and a backlight source. As shown in FIG. 7, the curved liquid crystal display panel comprises a glass 110 of a color filter substrate and a glass 120 of an array substrate, which are curved towards the same direction. When a surface of the curved liquid crystal display panel used to display is a concave surface, a surface of the color filter substrate facing users is concave, and stress-optical coefficients of the color filter substrate and the array substrate are both positive.

The color filter substrate and the array substrate are assembled with liquid crystals filled therebetween to form a curved liquid crystal layer 200, and an initial orientation of the curved liquid crystal layer is an orientation of the liquid crystal layer in a non-driven state before the liquid crystal layer is curved.

A first glass 310 covers an outer surface of the glass of the color filter substrate, a second glass 320 cover an outer surface of the glass of the array substrate, and the stress-optical coefficients of the first and the second glasses are negative; wherein the outer surfaces of glasses of the color filter substrate and the array substrate are surfaces of the substrates away from the liquid crystals; the product of the stress-optical coefficient and the thickness of the glass of the color filter substrate has an opposite sign to the product of the stress-optical coefficient and the thickness of the first glass, and the absolute values of the products are the same; the product of the stress-optical coefficient and the thickness of the glass of the array substrate has an opposite sign to the product of the stress-optical coefficient and the thickness of the second glass, and the absolute values of the products are the same.

A first polarizing plate 410 covers an outer surface of the first glass, a second polarizing plate 420 covers an outer surface of the first glass, and a polarization direction of the first polarizing plate is perpendicular to a polarization direction of the second polarizing plate; wherein the outer surfaces of the first and the second glasses are surfaces of the first and the second glasses away from the liquid crystals, the polarization direction of the first polarizing plate and the initial orientation of the curved liquid crystal layer form an angle of 90 degrees, and the polarization direction of the second polarizing plate is parallel to the initial orientation of the curved liquid crystal layer.

The arrows inside the first polarizing plate 410 and the second polarizing plate 420 indicate the polarization directions of the polarizing plates respectively, the arrows inside the first glass 310 and the second glass 320 indicate the main optical axis of the first and the second glasses respectively, the arrows inside the glass 110 of the color filter substrate and the glass 120 of the array substrate indicate the main optical axis of the substrates respectively, and the arrow inside the cured liquid crystal layer 200 indicates the initial orientation of the curved liquid crystal layer, wherein the initial orientation of the curved liquid crystal layer is an orientation of the liquid crystal layer in a non-driven state before the liquid crystal layer is curved.

The glass 110 of the color filter substrate and the first glass 310 are subjected to compression, and the glass 120 of the array substrate and the second glass 320 are subjected to stretching. The stress-optical coefficient of the glass 110 of the color filter substrate is positive, and the stress-optical coefficient of the glass 120 of the array substrate is negative. It is found that, based on testing, the main optical axis of the curved glass of the color filter substrate is perpendicular to the main optical axis of the curved glass of the array substrate, the angle between the main optical axis of the curved glass of the color filter substrate and the initial orientation of the curved liquid crystal layer is variable, and a maximum value of the variable angle is 45 degree, wherein the initial orientation of the curved liquid crystal layer is an orientation of the liquid crystal layer in a non-driven state before the liquid crystal layer is curved. When the curve is subjected to a compression, the main optical axis of the glass of the color filter substrate is perpendicular to the main optical axis of the first glass, and when the curve is subjected to a stretching, the main optical axis of the glass of the array substrate is perpendicular to the main optical axis of the second glass. The description hereinafter is based on the following situation, in which the angle between the main optical axis of the curved glass of the color filter substrate and the initial orientation of the curved liquid crystal layer is the maximum angle of 45 degree, and the angle between the main optical axis of the first glass and the initial orientation of the curved liquid crystal layer is 135 degree. In this situation, the degree of optical rotation of the color filter substrate and the first glass is at its maximum; the stress-optical coefficient of the glass of the array substrate is positive, the stress-optical coefficient of the second glass is negative, and when the curve is subjected to a stretching, the main optical axis of the glass of the array substrate and the main optical axis of the second glass are perpendicular with each other, and at angles of 135 and 45 degrees to the initial orientation of the curved liquid crystal layer respectively. At this time, the degree of optical rotation of the array substrate and the second glass is at its maximum.

When the curved liquid display panel according to this embodiment is at the non-driven state:

Natural light emitted by the backlight source firstly passes through the second polarizing plate 420 and becomes linearly polarized light, an oscillation direction of the linearly polarized light follows the polarization direction of the polarizing plate and is referred as zero degree linearly polarized light.

Figure 8:
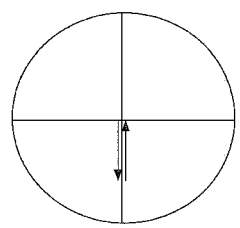
FIG. 8 is an illustrative drawing showing the optical rotation effects of the second glass and the glass of the array substrate of the curved liquid crystal display panel shown in FIG. 7.

After the linearly polarized light has been rotated by the second glass 320 subjected to stretching and having a negative stress-optical coefficient and the glass 120 of the array substrate subjected to stretching and having a positive stress-optical coefficient, the light is still a zero degree linearly polarized light; since the optical rotation effects of the second glass 320 subjected to stretching and having a negative stress-optical coefficient and the glass 120 of the array substrate subjected to stretching and having a positive stress-optical coefficient are opposite to each other, as show in FIG. 8, the arrow pointing downwards indicates the optical rotation of the array substrate, and the arrow pointing upwards indicates the optical rotation of the second glass, that is, the two optical rotation effects have opposite directions to each other and have the same degree; the delay caused by the curved glass of the array substrate counteracts the delay caused by the curved second glass, such that the light returns to the zero degree linearly polarized light.

Then, the zero degree linearly polarized light passes through the liquid crystal layer, and since the orientation of the liquid crystal layer is also at zero degree which will not cause a phase delay, the zero degree linearly polarized light will not change.

Subsequently, after the light has been rotated by the glass of the color filter substrate subjected to compression and having a positive stress-optical coefficient and the first glass subjected to stretching and having a negative stress-optical coefficient, the light is still a zero degree linearly polarized light; since the optical rotation effects of the glass of the color filter substrate subjected to compression and having a positive stress-optical coefficient and the first glass subjected to stretching and having a negative stress-optical coefficient are opposite to each other, the optical delay caused by the curved color filter substrate and the first glass are counteracted by each other.

Finally, the zero degree linearly polarized light passes through the first polarizing plate. At this time, the oscillation direction of the linearly polarized light is perpendicular to the polarization direction of the first polarizing plate, so that the curved liquid crystal display panel provides a display that is totally black. As compared with prior arts, the curved liquid crystal display panel according to this embodiment significantly reduces light leak, thereby improving the display effect of the curved liquid crystal display panel. When the angle between the main optical axis of the curved glass of the color filter substrate and the initial orientation of the curved liquid crystal layer is another degree, the principle of optical rotation thereof is the same as the above.

In a curved liquid crystal display panel according to a second embodiment of the invention, the polarization directions of the first polarizing plate and the second polarizing plate are parallel with each other, while other configurations are the same as those in the curved liquid crystal display panel according to the first embodiment.

In a non-driven state of the curved liquid crystal display panel according to this embodiment, when the linearly polarized light passes through the first polarizing plate, the oscillation direction of the linearly polarized light is substantially the same as the polarization direction of the first polarizing plate, the curved liquid crystal display panel is almost entirely bright and has uniform luminance. As compared with prior arts, the curved liquid crystal display panel according to this embodiment has uniform luminance, thereby improving the display effect of the curved liquid crystal display panel. The light path along which the light travels before passing through the first polarizing plate is the same as that in the first embodiment.

In a curved liquid crystal display panel according to a third embodiment of the invention, the stress-optical coefficients of the glasses of the array substrate and the color filter substrate are both negative, the stress-optical coefficients of the first and the second glasses are both positive, other configurations are the same as those in the first embodiment.

As long as the product of the stress-optical coefficient and the thickness of the glass of the color filter substrate has an opposite sign to the product of the stress-optical coefficient and the thickness of the first glass at the same side of the liquid crystal layer and the absolute values of the products are the same, optical delays generated by the them will be counteracted by each other; as long as the product of the stress-optical coefficient and the thickness of the glass of the array substrate has an opposite sign to the product of the stress-optical coefficient and the thickness of the second glass and the absolute values of the products are the same, optical delays generated by the them will be counteracted by each other.

Therefore, the technical problem to be solved and technical effect achieved by the curved liquid crystal display panel according to the third embodiment of the invention are the same as those by the curved liquid crystal display panel according to the first embodiment of the invention.

In a curved liquid crystal display panel according to a fourth embodiment of the invention, the polarization directions of the first polarizing plate and the second polarizing plate are the same, and other configurations are the same as those in the third embodiment.

In a non-driven state of the curved liquid crystal display panel according to this embodiment, when the linearly polarized light passes through the first polarizing plate, the oscillation direction of the linearly polarized light is substantially the same as the polarization direction of the first polarizing plate, the curved liquid crystal display panel is almost entirely bright and has uniform luminance. As compared with prior arts, the curved liquid crystal display panel according to this embodiment has uniform luminance, thereby improving the display effect of the curved liquid crystal display panel. The light path along which the light travels before passing through the first polarizing plate is the same as that in the third embodiment.

To be noted, as long as the product of the stress-optical coefficient and the thickness of the glass of the substrate has an opposite sign to the product of the stress-optical coefficient and the thickness of the glass covering the outer surface of the substrate at the same side of the liquid crystal layer as the substrate and the absolute values of the products are the same, optical delays generated by the them will be counteracted by each other. Therefore, the stress-optical coefficients of the glass of the substrate and the glass covering the outer surface of the substrate at the same side of the liquid crystal layer as the substrate are not limited to the manner as listed above, for example, it is also possible that the stress-optical coefficient of the glass of one substrate is positive while the stress-optical coefficient of the transparent layer covering the outer surface of the one substrate is negative, and the stress-optical coefficient of the glass of the other substrate is negative while the stress-optical coefficient of the transparent layer covering the outer surface of the other substrate is positive.

To be noted, as long as the product of the stress-optical coefficient and the thickness of the glass of the substrate has an opposite sign to the product of the stress-optical coefficient and the thickness of the glass covering the outer surface of the substrate at the same side of the liquid crystal layer as the substrate, optical delays generated by the them will be partially counteracted by each other. In the above embodiments, the absolute value of the product of the stress-optical coefficient and the thickness of the glass of the substrate is the same as the absolute value of the product of the stress-optical coefficient and the thickness of the glass covering the outer surface of the substrate at the same side of the liquid crystal layer as the substrate, such that optical delays generated by the them are counteracted by each other to the maximum. In practical process, there may be a certain difference between the absolute value of the product of the stress-optical coefficient and the thickness of the glass of the substrate and the absolute value of the product of the stress-optical coefficient and the thickness of the glass covering the outer surface of the substrate at the same side of the liquid crystal layer as the substrate, however, if the percentage of difference does not exceed 20% of the absolute value, the optical delays generated by the them may also be counteracted by each other to a large extent, and display effect of the curved liquid crystal display panel may be improved largely.

To be noted, the color filter substrate and the array substrate curved towards the same direction are not limited to the situation that the surfaces facing the users are concave, there may also be a situation that the surfaces facing the users are convex.

Apparently, those skilled in the art may change or modify the invention without departing from the spirit and scope of the invention. If changes or modifications of the invention fall within the scope of the claims of the invention and their equivalents, the invention is intended to include thus changes or modifications.

What is claimed is:

1. A curved liquid crystal display panel, comprising:
   two substrates curved towards a same direction with liquid crystals filled therebetween to form a curved liquid crystal layer;
   a transparent layer covering an outer surface of a glass of at least one of the substrates, a stress-optical coefficient of the glass of the at least one of the substrates and a stress-optical coefficient of the transparent layer at a same side of the liquid crystal layer having opposite signs, and in turn the glass of the at least one of the substrates and the transparent layer at a same side of the liquid crystal layer having their respective optical rotation effects opposite to each other when both of them are subjected to stretching or compression; and at a same side of the liquid crystal layer, a product of the stress-optical coefficient of the glass of the substrate and a thickness of the glass of the substrate having an opposite sign to a product of the stress-optical coefficient of the transparent layer and a thickness of the transparent layer, and a percentage of a difference between absolute values of the products being no more than 20%, and in turn both the products, and optical delays generated respectively by the glass of the at least one of the substrates and the transparent layer at a same side of the liquid crystal layer being at least partially counteracted by each other;
   wherein the outer surface of the glass of the at least one of the substrates is a surface of the glass of the at least one of the substrates away from the liquid crystals;
   in response to both of the stress-optical coefficients of the glasses of the two substrates being negative, both of the stress-optical coefficients of two transparent layers covering the glasses of the two substrates respectively are positive; and
   in response to the stress-optical coefficient of the glass of one of the substrates being positive while the stress-optical coefficient of the glass of the other one of the substrates being negative, the stress-optical coefficient of the transparent layer covering the outer surface of the one of the substrates is negative, while the stress-optical coefficient of the transparent layer covering the outer surface of the other one of the substrates is positive; and
   wherein the transparent layer is glass and the stress-optical coefficient of the transparent layer is a value in a range of −0.5 Brewster to −1.5 Brewster.

2. The curved liquid crystal display panel according to claim 1, wherein two transparent layers are covered on the outer surfaces of the glasses of the two substrates respectively;
   the curved liquid crystal display panel further comprises two polarizing plates covering outer surfaces of the two transparent layers respectively,
   wherein the outer surfaces of the two transparent layers are surfaces of the two transparent layers away from the liquid crystals.

3. The curved liquid crystal display panel according to claim 2, wherein a display mode of the curved liquid crystal display panel is In-Plane-Switching (IPS) mode.

4. The curved liquid crystal display panel according to claim 3, wherein a polarization direction of one of the polarizing plates is perpendicular to or parallel with an initial orientation of the curved liquid crystal layer; and
   wherein the initial orientation of the curved liquid crystal layer is an orientation of the curved liquid crystal layer in a non-driven state before the liquid crystal layer is curved.

5. The curved liquid crystal display panel according to claim 2, wherein a polarization direction of one of the polarizing plates is perpendicular to or parallel with an initial orientation of the curved liquid crystal layer; and
   wherein the initial orientation of the curved liquid crystal layer is an orientation of the curved liquid crystal layer in a non-driven state before the liquid crystal layer is curved.

6. The curved liquid crystal display panel according to claim 1, wherein a polarization direction of one of two polarizing plates covering outer surfaces of the two transparent layers respectively is perpendicular to or parallel with an initial orientation of the curved liquid crystal layer; and
   wherein the initial orientation of the curved liquid crystal layer is an orientation of the curved liquid crystal layer in a non-driven state before the liquid crystal layer is curved.

7. The curved liquid crystal display panel according to claim 6, wherein the polarization directions of two polarizing plates covering outer surfaces of the two transparent layers respectively are perpendicular or parallel with each other.

8. The curved liquid crystal display panel according to claim 7, wherein the two substrates comprise an array substrate and a color filter substrate.

9. A curved liquid crystal display device, comprising the curved liquid crystal display panel according to claim 1.

10. A curved liquid crystal display panel, comprising:
    two substrates curved towards a same direction;
    liquid crystals filled between the two substrates to form a curved liquid crystal layer;

a transparent layer covering an outer surface of a glass of at least one of the substrates, the outer surface of the glass of the at least one of the substrates being a surface of the glass of the at least one of the substrates away from the liquid crystals, wherein, at a same side of the liquid crystal layer, a product of a stress-optical coefficient of the glass of the substrate and a thickness of the glass of the substrate has an opposite sign to a product of the stress-optical coefficient of the transparent layer and a thickness of the transparent layer, and in turn the glass of the at least one of the substrates and the transparent layer at a same side of the liquid crystal layer have their respective optical rotation effects opposite to each other when both of them are subjected to stretching or compression; and a percentage of a difference between absolute values of the products is no more than 20%, and in turn both the products, and optical delays generated respectively by the glass of the at least one of the substrates and the transparent layer at a same side of the liquid crystal layer are at least partially counteracted by each other;

in response to both of the stress-optical coefficients of the glasses of the two substrates being negative, both of the stress-optical coefficients of two transparent layers are positive covering the glasses of the two substrates respectively; and in response to the stress-optical coefficient of the glass of one of the substrates being positive while the stress-optical coefficient of the glass of the other one of the substrates being negative, the stress-optical coefficient of the transparent layer covering the outer surface of the one of the substrates is negative, while the stress-optical coefficient of the transparent layer covering the outer surface of the other one of the substrates is positive; and wherein the transparent layer is glass and the stress-optical coefficient of the transparent layer is a value in a range of −0.5 Brewster to −1.5 Brewster.

11. The curved liquid crystal display panel according to claim 10, wherein two transparent layers are covered on the outer surfaces of the glasses of the two substrates respectively, and the curved liquid crystal display panel further comprises:

two polarizing plates covering outer surfaces of the two transparent layers respectively, wherein the outer surfaces of the two transparent layers are surfaces of the two transparent layers away from the liquid crystals.

12. The curved liquid crystal display panel according to claim 11, wherein the two substrates comprise an array substrate and a color filter substrate.

13. A curved liquid crystal display panel, comprising:

two substrates curved towards a same direction with liquid crystals filled therebetween to form a curved liquid crystal layer;

a transparent layer covering an outer surface of a glass of at least one of the substrates, a stress-optical coefficient of the glass of the at least one of the substrates and a stress-optical coefficient of the transparent layer at a same side of the liquid crystal layer having opposite signs, wherein the outer surface of the glass of the at least one of the substrates is a surface of the glass of the at least one of the substrates away from the liquid crystals;

in response to both of the stress-optical coefficients of the glasses of the two substrates being negative, both of the stress-optical coefficients of two transparent layers are positive; and in response to the stress-optical coefficient of the glass of one of the substrates being positive while the stress-optical coefficient of the glass of the other one of the substrates being negative, the stress-optical coefficient of the transparent layer covering the outer surface of the one of the substrates is negative, while the stress-optical coefficient of the transparent layer covering the outer surface of the other one of the substrates is positive; and wherein the transparent layer is glass and the stress-optical coefficient of the transparent layer is a value in a range of −0.5 Brewster to −1.5 Brewster.

14. A curved liquid crystal display panel, comprising:

two substrates curved towards a same direction;

liquid crystals filled between the two substrates to form a curved liquid crystal layer;

a transparent layer covering an outer surface of a glass of at least one of the substrates, the outer surface of the glass of the at least one of the substrates being a surface of the glass of the at least one of the substrates away from the liquid crystals, wherein, at a same side of the liquid crystal layer, a product of a stress-optical coefficient of the glass of the substrate and a thickness of the glass of the substrate has an opposite sign to a product of the stress-optical coefficient of the transparent layer and a thickness of the transparent layer, and a percentage of a difference between absolute values of the products is no more than 20%;

in response to both of the stress-optical coefficients of the glasses of the two substrates being negative, both of the stress-optical coefficients of two transparent layers are positive; and in response to the stress-optical coefficient of the glass of one of the substrates being positive while the stress-optical coefficient of the glass of the other one of the substrates being negative, the stress-optical coefficient of the transparent layer covering the outer surface of the one of the substrates is negative, while the stress-optical coefficient of the transparent layer covering the outer surface of the other one of the substrates is positive; and wherein the transparent layer is glass and the stress-optical coefficient of the transparent layer is a value in a range of −0.5 Brewster to −1.5 Brewster.

\* \* \* \* \*